US006529964B1

United States Patent
Schwendiman

(12) United States Patent
(10) Patent No.: US 6,529,964 B1
(45) Date of Patent: Mar. 4, 2003

(54) SYSTEM AND METHOD FOR MAINTAINING DEVICE NAME CONSISTENCY DURING PARALLEL DEVICE DISCOVERY PROCESS

(75) Inventor: Chris Alan Schwendiman, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/389,194

(22) Filed: Sep. 2, 1999

(51) Int. Cl.[7] .......................... G06F 13/00; G06F 13/10
(52) U.S. Cl. ............................. 710/8; 710/10; 710/15; 710/19
(58) Field of Search ............................. 710/8, 10, 15, 710/19

(56) References Cited

U.S. PATENT DOCUMENTS 5,768,542 A * 6/1998 Enstrom et al. ............ 710/104
5,809,329 A * 9/1998 Lichtman et al. ........... 709/321
5,828,899 A * 10/1998 Richard et al. ................ 710/8
6,259,271 B1 * 7/2001 Couts-Martin et al. ....... 326/40
6,349,347 B1 * 2/2002 Porterfield ................... 709/213

* cited by examiner

Primary Examiner—Jeffrey Gaffin
Assistant Examiner—Rehana Perveen
(74) Attorney, Agent, or Firm—Kelly K. Kordzik; Winstead Sechrest & Minick P.C.; Thomas F. Tyson

(57) ABSTRACT

Device configuration processes operated within an operating system are run in parallel up until one or more new devices are detected. Once that occurs, the configuration process waits for current running processes to complete without starting new ones, and then re-runs the configuration processes needing to define new devices in the order they would have run if the entire operation had been performed serially. As a result, since most configurations processes will not be detecting new devices, they will run all the way to completion in parallel with others, thereby reducing system boot times. However, if a new device is discovered, it will be assigned the correct name with respect to the other devices.

16 Claims, 5 Drawing Sheets

| FIG. 3B-1 | FIG. 3B-2 |

SYSTEM AND METHOD FOR MAINTAINING DEVICE NAME CONSISTENCY DURING PARALLEL DEVICE DISCOVERY PROCESS

CROSS-REFERENCE TO RELATED APPLICATION

The present application is related to U.S. patent application Ser. No. 09/389,201, entitled "Status Display for Parallel Activities," which is hereby incorporated by reference herein.

TECHNICAL FIELD

The present invention relates in general to operating system boot processes, and in particular, to configuring devices attached to a data processing system running the operating system.

BACKGROUND INFORMATION

During the boot of process for an operating system running on a data processing system, there is a need to discover what devices are attached to the data processing system for various purposes, such as loading device drivers that are necessary to make the devices operational on the operating system side. Such devices include, but are not limited to, hard drives, floppy drives, network cards, disk controllers, PCI buses, PCI cards, devices attached to PCI cards, parallel ports, input/output devices, etc. This process is accomplished through a configuration method, which may occur during the boot-up process or even later from initiation by an entered command.

The foregoing configuration method will assign names to devices as they are detected. Device names are used by users and software to access the device. When there are several devices of the same type that receive similar names, users like to be able to easily correlate the assigned device names to the actual devices. For example, suppose a computer system has three SCSI hard drives attached to it. AIX will name them hdisk0, hdisk1, and hdisk2. Which drive gets which name depends a lot on how the drives are attached to the system, for example, are they attached to different SCSI controllers and what SCSI ID is used for each drive. But given that they are attached in a particular way, users know that AIX will always assign the same name to each drive. Prior to this invention, the names are always assigned the same because the configure methods are always run serially in the same order. This is desired because users wish to know that with two identical systems with devices attached in exactly the same way, that the device names will be assigned exactly the same each time the devices are configured.

Therefore, there is a need in the art for a configuration naming process that assigns names to attached devices in a consistent and predictable manner, while still permitting the configuration processes to operate in parallel.

SUMMARY OF THE INVENTION

The present invention addresses the foregoing need by permitting the device configuration processes to be run simultaneously (parallel) up until one or more detect new devices. Once that occurs, configuration waits for currently running processes to complete without starting new ones, and then re-runs the configuration processes needing to define new devices in the order they would have run if the entire operation had been performed serially.

An advantage of the present invention is that most configuration processes will not be detecting new devices, and so will run all the way to completion in parallel with others, thereby reducing system boot times. However, if a new device is discovered, it will be assigned the correct name with respect to the other devices.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
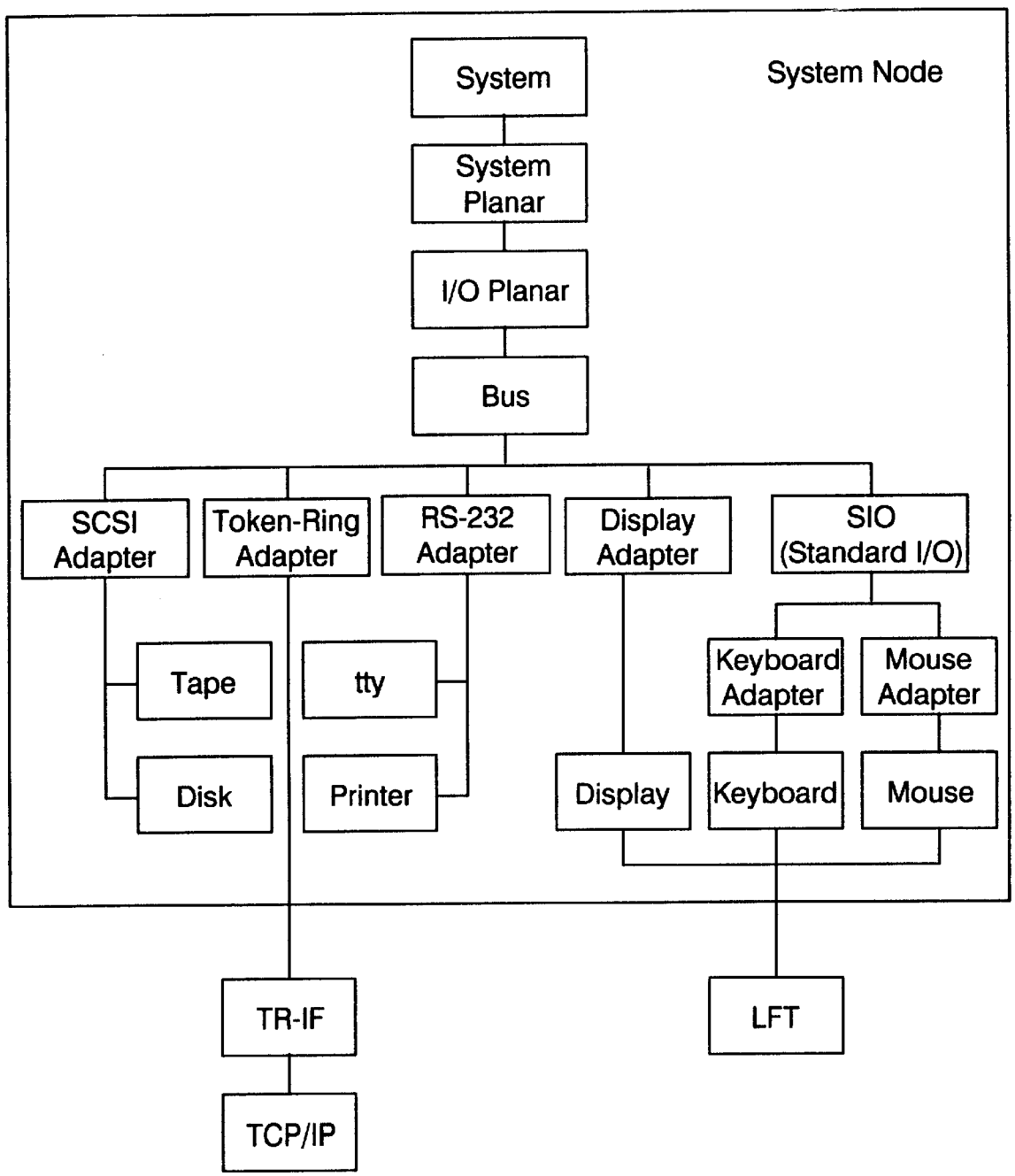
FIG. 1 illustrates an exemplary diagram of devices connected within a data processing system.

In operating systems that configure each attached device serially, assigning names is not a problem. However, in operating systems that run device configuration processes in parallel, to take advantage of a faster boot process, a problem occurs of assigning the correct names to the new devices as they are detected. If multiple new devices are discovered by the configuration processes, the new names assigned to the devices will be unpredictable. In fact, when the boot process is repeated, different names will likely be assigned to the devices each time. It is important that the names be assigned in a predictable fashion and exactly match what the names would be if the entire device configuration process were run serially, i.e., one at a time in sequence.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

The embodiment described herein with respect to the AIX operating system version 4.3, which is published at http:\\www.rs6000.ibm.com\doc_link\en_US\a_doc_lib\aixgen\topnav\topnav.htm, which is hereby incorporated by reference herein. However, the present invention is not limited in its applicability to the AIX operating system.

The present invention will be described below with respect to the configuration manager component of an AIX operating system. However, the concepts of the present invention may be expanded to other areas outside of this particular embodiment. The configuration manager is a rule-driven program that automatically configures devices in a data processing system during system boot and run time. When the configuration manager is invoked, it reads rules from the configuration rules object class and performs the indicated actions.

Devices are organized into a set of hierarchical tree structures. Individual entries in a tree are known as nodes and each represents a physical or logical device. Each tree represents a logical subsystem. For example, the tree containing the system node consists of all of the physical devices in the system. Thus, the top node in the tree is the system node, which represents the system device, and has nodes connected below that represent individual pieces of the system. Below the system node is the system planar node which represents the system planar in the system. Below the system planar node are one or more bus nodes, which represent the I/O buses in the system. Since adapter devices are connected to bus devices, adapter nodes fall below the bus nodes in the tree. The bottom of the hierarchy contains devices to which no other devices are connected. FIG. 1 illustrates an example of a connectivity and dependence diagram providing an example of the connections and dependencies of devices in a system.

Each rule in the configuration rules object class specifies a program name that the configuration manager must execute. These programs are typically the configuration programs for the devices at the top of the nodes. When these programs are invoked, the names of the next lower-level devices that need to be configured are returned. The configuration manager configures the next lower-level devices by invoking the configuration methods for those devices. In turn, those configuration methods return a list of to-be-configured device names. The process is repeated until no more device names are returned.

Figure 2:
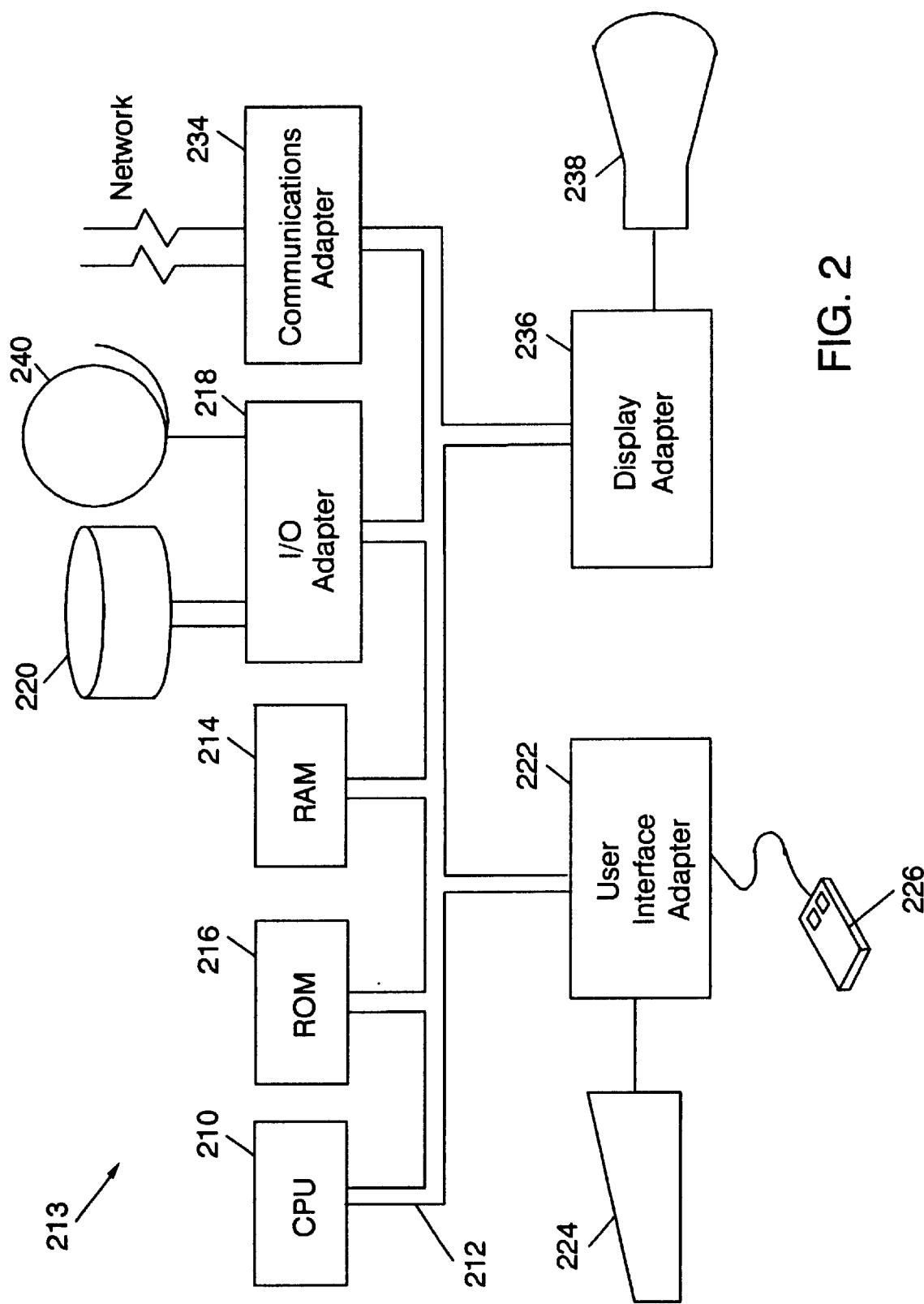
FIG. 2 illustrates a data processing system configurable in accordance with the present invention.

Referring next to FIG. 2, there is illustrated data processing system 213, which may be configured to operate in accordance with the present invention. System 213 shows only a few of the devices that may be attached to the system, such as illustrated in FIG. 1. System 213 in accordance with the subject invention includes central processing unit (CPU) 210, such as a conventional microprocessor, and a number of other units interconnected via system bus 212. System 213 includes random access memory (RAM) 214, read only memory (ROM) 216, and input/output (I/O) adapter 218 for connecting peripheral devices such as disk units 220 and tape drives 240 to bus 212, user interface adapter 222 for connecting keyboard 224, mouse 226, and/or other user interface devices such as a touch screen device (not shown) to bus 212, communication adapter 234 for connecting workstation 213 to a data processing network, and display adapter 236 for connecting bus 212 to display device 238. CPU 210 may include other circuitry not shown herein, which will include circuitry commonly found within a microprocessor, e.g., execution unit, bus interface unit, arithmetic logic unit, etc. CPU 210 may also reside on a single integrated circuit.

Preferred implementations of the invention discussed in more detail below with respect to FIG. 3 include implementations as a computer system programmed to execute the method or methods described herein, and as a computer program product. According to the computer system implementation, sets of instructions for executing the method or methods may be resident in the RAM 214 or ROM 216 of one or more computer systems configured generally as described above. Until required by the computer system 213, the set of instructions may be stored as a computer program product in another computer memory, for example, in disk drive 220 (which may include a removable memory such as an optical disk or floppy disk for eventual use in the disk drive 220). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical, biological, or some other physical change. While it is convenient to describe the invention in terms of instructions, symbols, characters, or the like, the reader should remember that all of these and similar terms should be associated with the appropriate physical elements.

Note that the invention may describe terms such as comparing, validating, selecting, identifying, or other terms that could be associated with a human operator. However, for at least a number of the operations described herein which form part of at least one of the embodiments, no action by a human operator is desirable. The operations described are, in large part, machine operations processing electrical signals to generate other electrical signals.

The present invention provides a system and method that allows a device configuration process to notify the overall configuration controlling process, such as the configuration manager in AIX, that it has discovered a new device. For AIX, a specific exit code is designed for this purpose, but other means of communicating the information would work just as well. At the same time, a mechanism is provided that communicates to the device configuration process whether it is being run in parallel with others, or singularly by itself. This is necessary for the device configure method to determine if it can proceed and add in the new device, which it can do if it is the only running configuration process, or exit back to the controlling process. Within AIX, a shell environment variable is used to pass this information to the device configuration processes.

Essentially, a basic idea of the present invention is that the controlling process runs the device configuration processes in parallel until it receives notification that a new device has been discovered. Upon receiving such notification, the controlling process waits for all running configuration processes to complete without starting any new ones. It will then run device configuration processes serially skipping over those that have already run to completion without detecting any new devices, until the one that returned the new device detected indication has completed. It then resumes running configuration processes in parallel.

As an example, assume that devices A, B, C, D, and E are known to the operating system and that attached to device D is a new device which is to be named F. If the entire configuration procedure was run serially, the configuration processes would be run in order with A first, followed by B, C, and D. The configuration process for D would discover device F and add it to the list. Then the device configuration process for E would be run, followed by the configuration process for F.

However, in the parallel configuration of the present invention, lets assume that the controlling process starts the configuration processes for devices A, C, and D in parallel, with the configuration process for B being skipped for the time being (it is not important to this invention as to why it is skipped, just that it could happen for various reasons). The configuration process for D detects the new device and recognizes that it is being run in parallel with other configuration processes and so notifies the controlling process that it has detected a new device and exits. The controlling process waits for the configuration processes for A and C to complete. Once they complete, the controlling process returns to the beginning of the list, skips A because its configuration process has completed, runs the configuration process for B and waits for it to complete, skips the configuration process for C because it is already completed, and then reruns the configuration process for D. The configuration process for D adds the new device F to the list and completes. Now the controlling process can begin the configuration processes for E and F in parallel. In this example, it is important that the configuration process for B be run before rerunning the process for D to give it a chance to discover and name new devices. In this way, it is guaranteed that new devices receive the correct names.

Figure 3A:
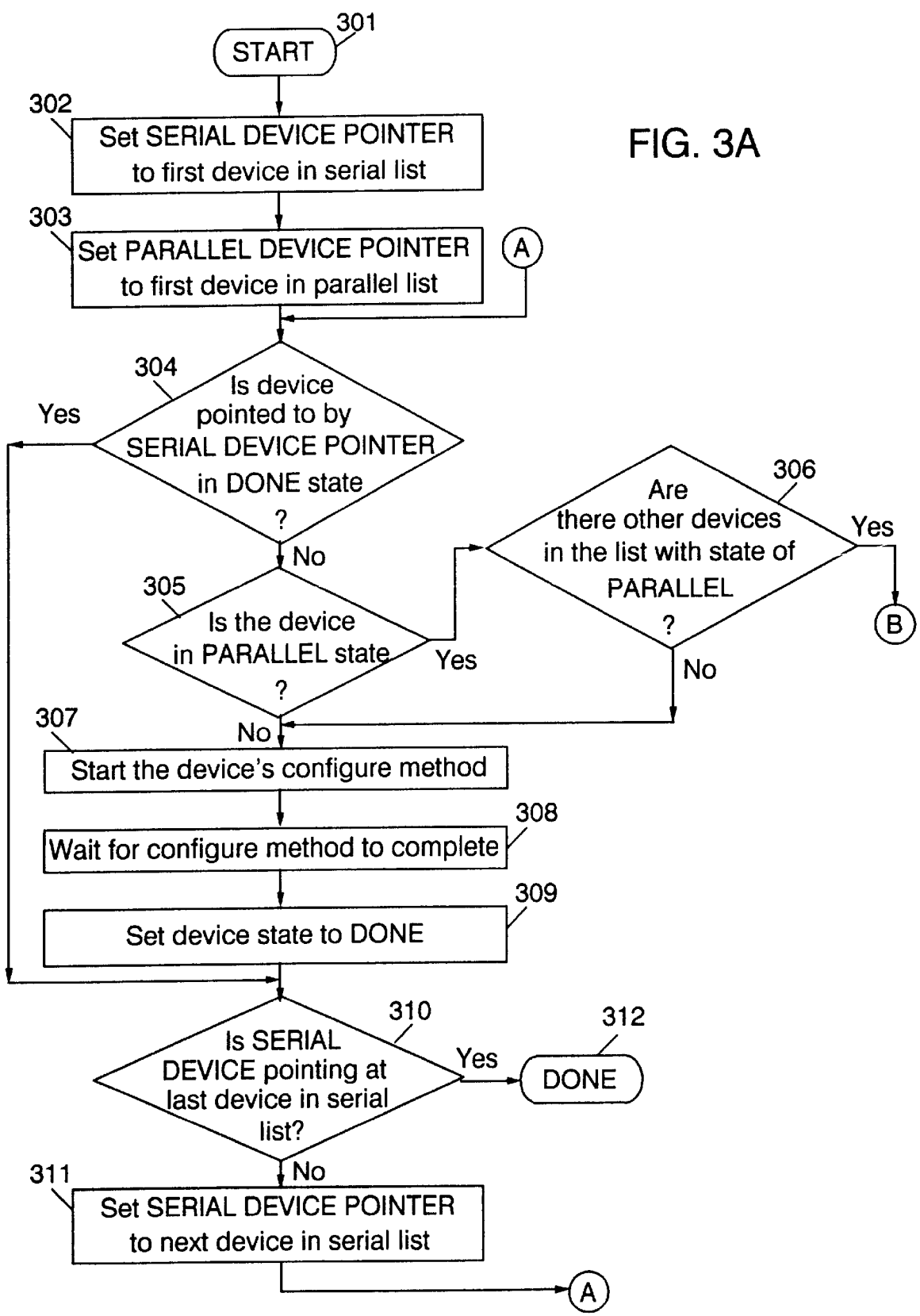
FIGS. 3A and 3B illustrate a method for implementing an embodiment of the present invention.
Figures 1, 3B:
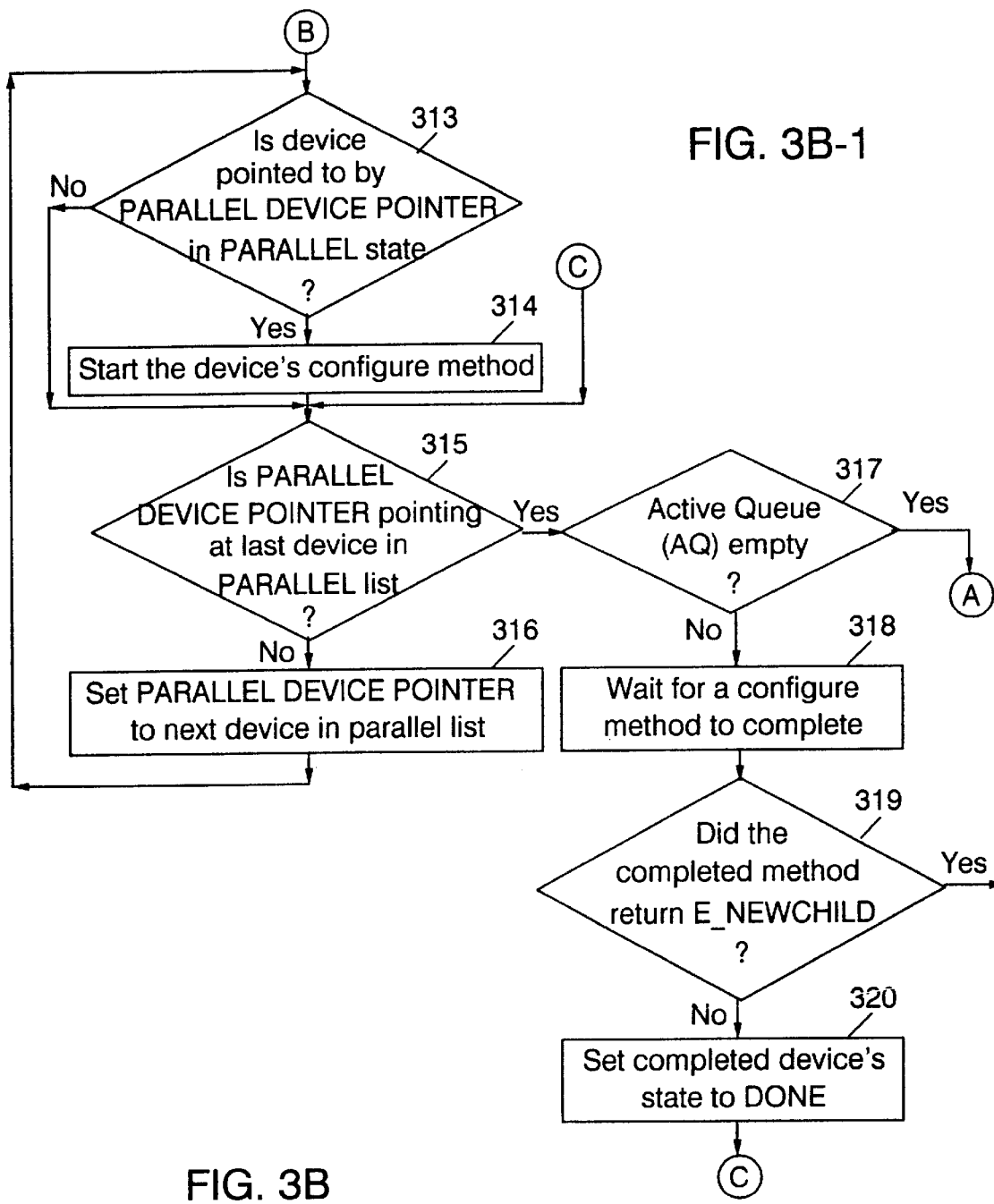

In the following description of FIGS. 3A and 3B, the following terms have the following definitions:

DEVICE STATE—can be one of the following:

Parallel—the device's configure method can be run in parallel with other configure methods.

Serial—the device's configure method must be run serially.

Done—the device's configure method has already been run and completed.

Devices whose configure method supports being run in parallel with others will be initialized to the Parallel state. If not, they are initialized to the Serial state.

ACTIVE QUEUE or AQ—this is a list of currently running device configure methods. The flow diagram in FIGS. 3A and 3B illustrates a configure method being added to the ACTIVE QUEUE, but does not show them being removed in the blocks for waiting for a configure method to complete.

E_NEWCHILD—the return status from a configure method indicating that the configure method has detected new devices and must be run again serially. In other words, the device state must be changed to Serial.

DEVICE LIST—this is the list of devices of which the configure manager (cfgmgr) command is aware and for which it needs to run configure methods. The list actually grows as the configure methods run and return names of additional devices to the configure manager. The flow diagram does not illustrate devices being added to the list. The devices are actually kept in two lists, the Serial List and the Parallel List. Both lists contain the same set of devices but may consist of a different ordering.

SERIAL LIST—this is a tree structure representing parent-child and sibling relationships. It is used when running the configure methods in Serial. It is traversed in a "breadth-first" fashion to ensure that all devices at a given level in the tree are configured before going to the next level down in the tree.

PARALLEL LIST—this is a simple list with additional devices always added at the end of the list. It is used when running the configure methods in parallel with others. The order in which the configure methods are run is not important when running them in parallel.

SERIAL DEVICE POINTER—Pointer to a device in the Serial List. It is used only when traversing the Serial List and running configure methods serially.

PARALLEL DEVICE POINTER—Pointer to a device in the Parallel List. It is used only when traversing the Parallel List and running configure methods in parallel with others.

The list of devices is actually maintained with two distinct orderings. The first ordering, which is referred to as the Parallel List, is a list with the devices in the same order that the configuration manager learns about them. The second ordering, which is referred to as the Serial List, is based on a tree structure representing all of the device parent-child and sibling relationships. The ordering is a breadth-first ordering of the devices in the tree. This can be thought of as starting with the top node in the tree, then running through all the devices at the next level, the children of the top node, in a left to right fashion, then through all the devices at the next level, which consists of all the children of children of the top node, also left to right. This continues through each level of the tree, left to right, until all devices are accounted for.

As configure methods complete for devices they may return names of additional devices that need to be configured. These additional devices are always added at the end of the Parallel List and as children in the Serial List under the devices whose methods returned them. Thus, the ordering of the existing devices in the Parallel List are never affected when additional devices are added. However, the ordering of the existing devices in the Serial List may be affected when new devices are added. For example, if there are two sibling devices in the Serial List and the configure method for the second is run to completion before the configure method for the first device is run, then children of the second device will be added to the tree first. Later, when the first device's configure method completes, any children added to the tree are added ahead of the sibling device's children.

The Serial Device Pointer, is initialized to the first device in the Serial List and the Parallel Device Pointer is initialized to the first device in the Parallel List.

While running device configurations serially, i.e., in Serial mode, the Serial List is used to determine which device configure methods to run. If the device currently pointed to by the Serial Device Pointer has a device state of DONE, then it is skipped and the Serial Device Pointer is set to the next device in the Serial List. If the device state is SERIAL, then the device's configure method is run, and after the method completes, the Serial Device Pointer is set to the next device in the Serial List. If the device state is PARALLEL, a check is made to see if there are any other devices waiting to be configured whose methods can be run in parallel. If not, the configure method for the device is run just as though its Device State were SERIAL. However, if there are others, a switch is made to Parallel mode.

In Parallel Mode, device methods are run in parallel with others. The Parallel List is used to determine which device configure methods to run. If the device currently pointed to by the Parallel Device Pointer has a Device State of DONE or SERIAL, then it is skipped and the Parallel Device Pointer is set to the next device in the Parallel List. If the Device State is PARALLEL, then the configure method for the device is started and the Parallel Device Pointer is set to the next device in the Parallel List, without waiting for the method to complete. Eventually, all the methods in the list that can be run in parallel will have been started and the Parallel Device Pointer will be pointing at the last device in the Parallel List. At this point, a switch back to Serial mode may be needed to run the configure methods for devices that were skipped while processing in Parallel mode. But before a switch can be made back to Serial mode, all configure methods currently running in parallel must first complete. Of course, any that complete may return additional devices that get added to the Parallel and Serial Lists. If this happens, the Parallel Device Pointer is set to the next device, the first one added to the Parallel List, and processing continues in Parallel mode.

While in Parallel mode if a completing configure method returns an indication that a new child has been discovered and needs to be named, i.e., returns E_NEWCHILD, then the completion of all configure methods currently running in parallel is waited on, and the mode is switched to Serial mode regardless of whether or not one of the completing configure methods returned additional device names.

When switching from Parallel mode to Serial mode, processing begins with the device pointed to by the Serial Device Pointer. This is either the first device in the Serial List that it was initialized to, or the device it pointed to when previously processing in Serial mode. Similarly, when switching from Serial mode to Parallel mode, processing begins with the device pointed to by the Parallel Device Pointer. This is either the first device in the Parallel List that it was initialized to, or the device it pointed to when previously processing in Parallel mode. As configure methods complete and return additional names of devices that need to be configured, these devices are added into the Serial List somewhere after the device pointed to by the Serial Device Pointer, because they are added as children of the current device. And, they are added after the device pointed to by the Parallel Device Pointer, because they are added at the end of the Parallel List. Thus, the devices from the first device to the current device in both orderings never need to be rechecked as nothing is ever added into the lists ahead of the current devices.

When the last device is reached in both orderings and there are no configure methods still running, the entire process is complete.

With this approach both the Serial and Parallel lists are very important. The Serial List cannot be used when processing in Parallel mode because configure methods for devices ahead of the current device could complete and return device names. It is possible that the returned names, which correspond to the children of the device whose method just completed, could also be added ahead of the current device. Thus, there could still be devices that need to be configured once the end of the list is reached.

Furthermore, the Parallel List cannot be used when processing in Serial mode because the ordering of the devices may not match the desired breadth-first tree ordering. This happens in Parallel mode if the configure methods for two devices are started but the second one completes and returns device names before the first. The breadth-first tree ordering is necessary to ensure that the correct names are assigned for new devices. This is why the mode is switched to Serial mode when a configure method that was run in parallel returns an indication that it needs to define and name a new device.

It should be noted that this description describes one method of maintaining the two orderings used for Serial and Parallel modes. Other forms of lists can be used along with different schemes for adding additional devices to the lists as long as they maintain the necessary ordering when it comes to assigning new device names, and that ordering must be equivalent to the breadth-first tree ordering described herein.

Figures 2, 3B:
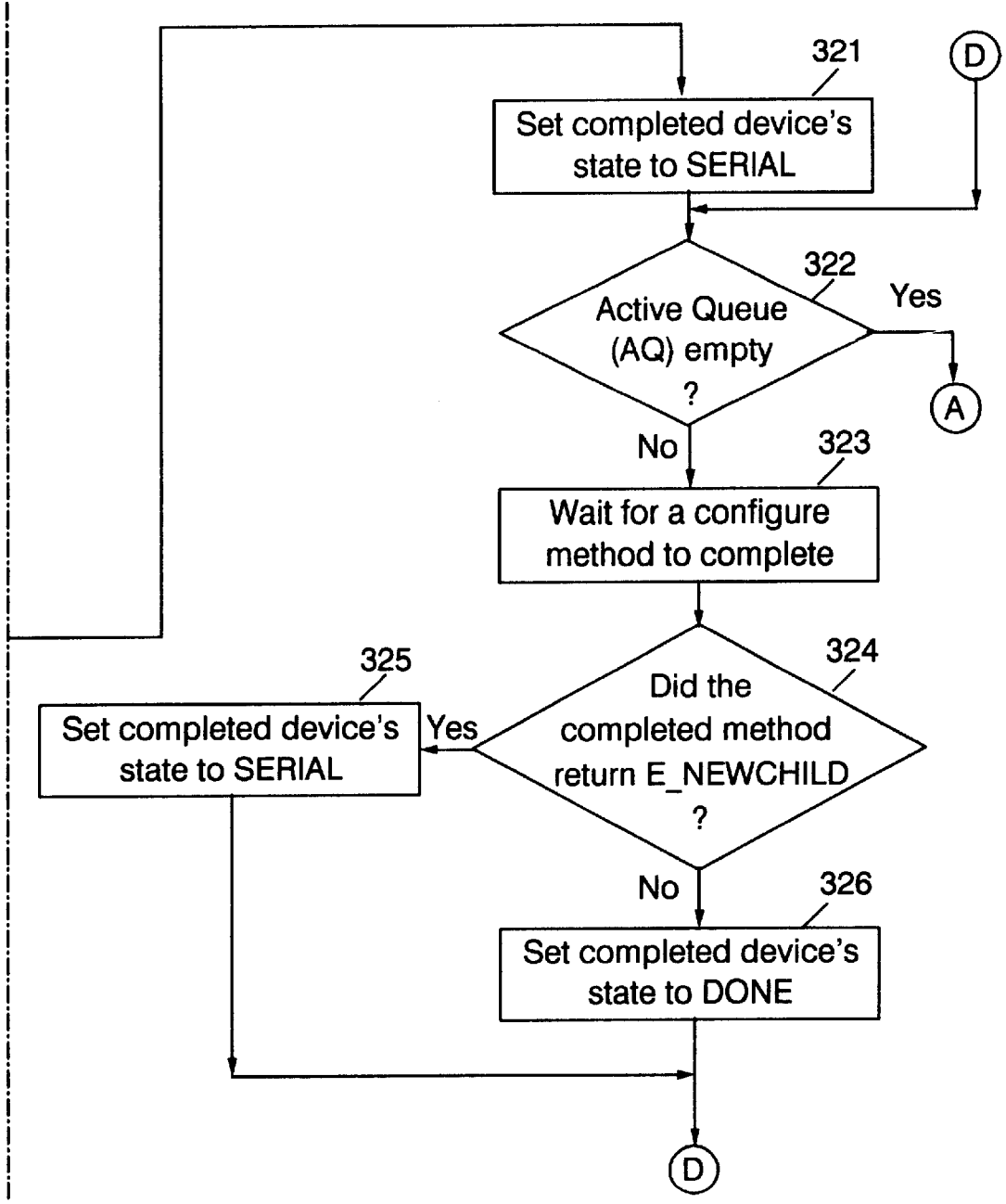

FIG. 3 illustrates an embodiment of the foregoing process. The process begins at step 301 and proceeds to step 302 to set the Serial Device Pointer to the first device in the Serial List. Thereafter, in step 303, the Parallel Device Pointer is set to the first device in the Parallel List. Thereafter, in step 304, a determination is made whether the device pointed to by the Serial Device Pointer is in a DONE state. If yes, the process will proceed to step 310. If in step 304, the device pointed to by the Serial Device Pointer is not in a DONE state, the process proceeds to step 305 to determine whether the device is in a Parallel State. If not, the process proceeds to step 307 to start the device's configure method. Thereafter, in step 308, the process waits for the configure method begun in step 307 to complete. Then in step 309, the device's state is set to DONE, and the process proceeds to step 310. In step 310, a determination is made whether the Serial Device Pointer is pointing at the last device in the Serial List. If yes, the process proceeds to step 312 where the process is completed. If in step 310, the Serial Device Pointer is not pointing to the last device in the Serial List, the process proceeds to step 311 to set the Serial Device Pointer to the next device in the Serial List, and the process then returns to step 304.

In step 305, if it is determined that the device pointed to by the Serial Device Pointer is in a Parallel State, the process proceeds to step 306 to determine if there are other devices in the list with a state of PARALLEL. If not, the process will return to step 307. However, if in step 306, there are other devices in the list with a state of PARALLEL, the process will proceed to step 313.

In step 313, a determination is made whether the device pointed to by the Parallel Device Pointer is in a Parallel State. If not, the process will forward to step 315. However, if the device pointed to by the Parallel Device Pointer is in a Parallel State, then the process proceeds to step 314 to start that device's configure method. The process will then forward to step 315. In step 315, a determination is made whether the Parallel Device Pointer is pointing at the last device in the Parallel List. If not, the process will proceed to step 316 to set the Parallel Device Pointer to the next device in the Parallel List, and the process then returns to step 313. If in step 315, it is determined that the Parallel Device Pointer is pointing at the last device in the Parallel List, then the process proceeds to step 317 to determine if the ACTIVE QUEUE is empty. If the ACTIVE QUEUE is empty, the process will return to step 304. If the ACTIVE QUEUE is not empty, the process proceeds to step 318 to wait for a configure method in the ACTIVE QUEUE to complete. Thereafter, in step 319, a determination is made if the completed method returned E_NEWCHILD. If not, the process proceeds to step 320 to set the completed device's state to DONE, and the process returns to step 315. If in step 319, the completed method returned E_NEWCHILD, the process proceeds to step 321 to set the completed device's state to SERIAL. Thereafter, in step 322, a determination is made whether the ACTIVE QUEUE is empty. If the ACTIVE QUEUE is empty, the process returns to step 304. If the ACTIVE QUEUE is not empty, then the process forwards to step 323 to wait for a configure method to complete. Thereafter, in step 324, a determination is made whether the completed method returned E_NEWCHILD. If the completed method returned E_NEWCHILD, the process proceeds to step 325 to set the completed device's state to SERIAL, and the process then returns to step 322. If in step 324, the completed method did not return E_NEWCHILD, the process proceeds to step 326 to set the completed device's state to DONE, and the process returns to step 322.

Although the present invention and its advantages have been described in detail, it should be understood that various changes, substitutions and alterations can be made herein without departing from the spirit and scope of the invention as defined by the appended claims.

What is claimed is:

1. In a data processing system, a method for configuring devices coupled to the data processing system, comprising the steps of:

beginning a first configuring method for a first device coupled to the data processing system;

beginning a second configuring method for a second device coupled to the data processing system, wherein the first and second configuring methods are running in parallel;

beginning a third configuring method for a third device coupled to the data processing system;

determining that a fourth device is coupled to the third device;

exiting the third configuring method;

completing the first and second configuring method;

beginning and completing the third configuring method; and beginning a fourth configuring method for the fourth device.

2. The method as recited in claim 1, wherein the devices are arranged in a hierarchical tree structure, wherein the first, second, and third devices are at a first level in the hierarchical tree structure and the fourth device is at a second level below the first level, wherein the first level is a parent of the second level.

3. An operating system operable for performing a configuration process for a plurality of devices coupled to a data processing system running the operating system, the operating system comprising the program steps of:

beginning configuring methods for those ones of the plurality of devices that can be configured in parallel with other devices;

completing the configuring methods for those ones of the plurality of devices that can be configured in parallel with other devices;

determining that one or more of those ones of the plurality of devices had a new device coupled thereto; and performing the-configuring methods in a serial manner for the one or more of those ones of the plurality of devices that had a new device coupled thereto.

4. An operating system operable for performing a configuration process for a plurality of devices coupled to a data processing system running the operating system, the operating system comprising the program steps of:

beginning configuring methods for those ones of the plurality of devices that can be configured in parallel with other devices;

completing the configuring methods for those ones of the plurality of devices that can be configured in parallel with other devices; and after the completing step, performing configuring methods in a serial manner on those ones of the plurality of devices that cannot be configured in parallel with other devices.

5. The operating system as recited in claim 4, wherein the serial manner performs the configuring method on each device that cannot be configured in parallel and its child before moving on to the next device in the series.

6. The operating system as recited in claim 4, wherein the configuring methods name the devices.

7. A data processing system comprising a processor coupled to a plurality of devices in a hierarchical tree structure, the processor operable for performing a configuration process for the plurality of devices coupled to the data processing system comprising:

circuitry for beginning configuring methods of those ones of the plurality of devices that can be configured in parallel with other devices;

circuitry for completing the configuring methods for those ones of the plurality of devices that can be configured in parallel with other devices;

circuitry for determining that one or more of those ones of the plurality of devices had a new device coupled thereto; and circuitry for performing the configuring methods in a serial manner for the one or more of those ones of the plurality of devices that had a new device coupled thereto.

8. A data processing system comprising a processor coupled to a plurality of devices in a hierarchical tree structure, the processor operable for performing a configuration process for the plurality of devices coupled to the data processing system comprising:

circuitry for beginning configuring methods of those ones of the plurality of devices that can be configured in parallel with other devices;

circuitry for completing the configuring methods for those ones of the plurality of devices that can be configured in parallel with other devices; and circuitry for performing configuring methods in a serial manner on those ones of the plurality of devices that cannot be configured in parallel with other devices.

9. The system as recited in claim 8, wherein the serial manner performs the configuring method on each device that cannot be configured in parallel and its child before moving on to the next device in the series.

10. A data processing system comprising a processor coupled to a plurality of devices in a hierarchical tree structure, the processor operable for performing a configuration process for the plurality of devices coupled to the data processing system comprising:

circuitry for beginning configuring methods of those ones of the plurality of devices that can be configured in parallel with other devices;

circuitry for completing the configuring methods for those ones of the plurality of devices that can be configured in parallel with other devices, wherein the configuring methods name the devices with the same names each time the configuring process is performed.

11. A data processing system comprising a processor coupled to a plurality of devices in a hierarchical tree structure, the processor operable for performing a configuration process for the plurality of devices coupled to the data processing system comprising:

circuitry for beginning configuring methods of those ones of the plurality of devices that can be configured in parallel with other devices;

circuitry for completing the configuring methods for those ones of the plurality of devices that can be configured in parallel with other devices;

circuitry for beginning a first configuring method for a first device coupled to the data processing system;

circuitry for beginning a second configuring method for a second device coupled to the data processing system, wherein the first and second configuring methods are running in parallel;

circuitry for beginning a third configuring method for a third device coupled to the data processing system;

circuitry for determining that a fourth device is coupled to the third device;

circuitry for exiting the third configuring method;

circuitry for completing the first and second configuring methods;

circuitry for beginning and completing the third configuring method; and circuitry for beginning a fourth configuring method for the fourth device, wherein the devices are arranged in the hierarchical tree structure, wherein the first, second, and third devices are at a first level in the hierarchical tree structure and the fourth device is at a second level below the first level, wherein the first level is a parent of the second level.

12. A method comprising the steps of:

(a) setting a serial device pointer to a first device in a serial list;

(b) setting a parallel device pointer to a first device in a parallel list;

(c) determining if the first device pointed to by the serial device pointer is in a DONE state;

(d) if the first device pointed to by the serial device pointer is not in a DONE state, determining if the first device pointed to by the serial device pointer is in a parallel state;

(e) if the first device pointed to by the serial device pointer is in a parallel state, determining if there are any other devices in the serial list with a state of PARALLEL;

(f) if there are any other devices in the serial list with the state of PARALLEL, determining if the first device pointed to by the parallel device pointer is in a PARALLEL state;

(g) if the first device pointed to by the parallel device pointer is in the PARALLEL state, beginning such first device's configure method;

(h) determining if the parallel device pointer is pointing to a last device in the parallel list;

(i) if the parallel device pointer is not pointing to the last device in the parallel list, setting the parallel device pointer to a next device in the parallel list and returning to step (f).

13. The method as recited in claim 12, further comprising the steps of:

(j) if the parallel device pointer is pointing to the last device in the parallel list, determining if an active queue is empty;

(k) if the active queue is not empty, waiting for a configure method to complete;

(l) determining if a completed configure method discovered a new device;

(m) if the completed configure method discovered the new device, setting the completed device's state to SERIAL;

(n) determining if the active queue is empty;

(o) if the active queue is not empty, waiting for a configure method to complete;

(p) determining if a completed configure method discovered a new device;

(q) if the completed configure method discovered the new device, setting the completed device's state to SERIAL and returning to step (n); and (r) if the completed configure method did not discover the new device, setting the completed device's state to DONE and returning to step (n).

14. The method as recited in claim 13, further comprising the steps of:

(s) if in either of steps (j) or (n), the active queue is empty, returning to step (c); and (t) if in step (l) the completed configure method did not discover the new device, setting the completed device's state to DONE, and returning to step (h).

15. The method as recited in claim 14, further comprising the steps of:

(u) if in step (d) it is determined that the first device pointed to by the serial device pointer is not in the parallel state, beginning such first device's configure method;

(v) waiting for the configure method begun in step (u) to complete;

(w) setting the first device's state to DONE;

(x) determining if the serial device pointer is pointing to a last device in the serial list;

(y) if the serial device pointer is pointing to the last device in the serial list, completing the method; and (z) if the serial device pointer is not pointing to the last device in the serial list, setting the serial device pointer to a next device in the serial list, and returning to step (c).

16. The method as recited in claim 15, further comprising the steps of:

(aa) if there are not any other devices in the serial list with a state of PARALLEL, proceeding to step (u); and (bb) if the first device pointed to by the serial device pointer is not in the DONE state, proceeding to step (x).

* * * * *